(12) United States Patent
Takakura et al.

(10) Patent No.: US 9,702,744 B2
(45) Date of Patent: Jul. 11, 2017

(54) FLUID CONTROL DEVICE

(71) Applicant: HORIBA STEC, Co., Ltd., Kyoto-shi, Kyoto (JP)

(72) Inventors: Hiroshi Takakura, Kyoto (JP); Daichi Kunita, Kyoto (JP)

(73) Assignee: HORIBA STEC, Co., Ltd., Kyoto-shi, Kyoto (JP)

(*) Notice: Subject to any disclaimer, the term of this patent is extended or adjusted under 35 U.S.C. 154(b) by 463 days.

(21) Appl. No.: 14/261,353

(22) Filed: Apr. 24, 2014

(65) Prior Publication Data

US 2014/0324233 A1 Oct. 30, 2014

(30) Foreign Application Priority Data

Apr. 25, 2013 (JP) .................................. 2013-092962

(51) Int. Cl.
| | | |
|---|---|---|
| *G05D 9/00* | (2006.01) | |
| *G01F 1/684* | (2006.01) | |
| *G05D 7/06* | (2006.01) | |

(52) U.S. Cl.
CPC ........... *G01F 1/684* (2013.01); *G05D 7/0635* (2013.01)

(58) Field of Classification Search
CPC .. G06F 11/3006; G06F 11/25; G06F 11/3644; G06F 11/261; G06F 3/0623; H03M 7/30; A61B 5/02416; H04Q 9/16; G11C 11/5621; A61F 9/013; G01F 1/684
See application file for complete search history.

(56) References Cited

U.S. PATENT DOCUMENTS

| | | | | | |
|---|---|---|---|---|---|
| 4,608,560 A | * | 8/1986 | Allgood | .................... | H04Q 9/16 340/3.1 |
| 6,081,783 A | * | 6/2000 | Divine | .................... | H03M 7/30 704/201 |

(Continued)

FOREIGN PATENT DOCUMENTS

| | | | |
|---|---|---|---|
| JP | H0991009 A | 4/1997 | |
| JP | H1011357 A | 1/1998 | |

(Continued)

OTHER PUBLICATIONS

Japan Patent Office, Office Action Issued in Japan Patent Application No. 2013-092962, Dec. 27, 2016, 2 pages.

*Primary Examiner* — Tuan Vu
(74) *Attorney, Agent, or Firm* — Alleman Hall Creaman & Tuttle LLP

(57) ABSTRACT

The present invention is intended to inhibit a communication program from crashing in the case where a power source is turned off while writing or rewriting of a measurement control program from an external device is performed by a communication part, and includes: a first recording part for storing the communication program for controlling the communication part; a second recording part for storing a measurement control program for controlling the measurement control part; and a central processing unit. In this configuration, the communication program stored in the first recording part is configured to be unrewritable by the central processing unit and the measurement control program stored in the second recording part is configured to be rewritable by the central processing unit.

2 Claims, 3 Drawing Sheets

(56) References Cited

U.S. PATENT DOCUMENTS

| | | | | |
|---|---|---|---|---|
| 2002/0065646 A1* | 5/2002 | Waldie | ............... | G06F 11/3644 703/26 |
| 2003/0045895 A1* | 3/2003 | Ross | ............... | A61F 9/013 606/166 |
| 2004/0019826 A1* | 1/2004 | Nishibata | ............... | G06F 11/25 714/28 |
| 2007/0263440 A1* | 11/2007 | Cornwell | ............... | G11C 11/5621 365/185.03 |
| 2011/0078596 A1* | 3/2011 | Rawlins | ............... | G06F 11/261 715/764 |
| 2011/0246715 A1* | 10/2011 | Doran | ............... | G06F 3/0623 711/112 |
| 2012/0249766 A1* | 10/2012 | Narusawa | ............... | A61B 5/02416 348/77 |
| 2013/0151173 A1* | 6/2013 | Yamamoto | ............... | G06F 11/3006 702/57 |

FOREIGN PATENT DOCUMENTS

| | | | |
|---|---|---|---|
| JP | 2005531069 | A | 10/2005 |
| JP | 200699215 | A | 4/2006 |
| JP | 2007114883 | A | 5/2007 |
| WO | 04001516 | A1 | 12/2003 |

\* cited by examiner

FLUID CONTROL DEVICE

TECHNICAL FIELD

The present invention relates to a fluid control device such as a mass flow controller for controlling a flow rate of, for example, gas.

BACKGROUND ART

As a mass flow controller (also referred to as "MFC" hereinafter) for controlling a flow rate of gas used in, for example, a semiconductor process, there has been known a configuration as disclosed in JP-T-2005-531069.

This MFC includes: a flow sensor for measuring a mass flow rate of fluid flowing through a flow passage; a flow control valve for adjusting a mass flow rate of fluid flowing through the flow passage; a control part for controlling the flow control valve based on a flow rate measurement value from the flow sensor and a predetermined set flow rate value; and a communication part for performing communication with an external device. Further, in an internal memory provided in, for example, the control part, there is stored a communication program for controlling the communication part together with a measurement control program for controlling the flow control valve and the like.

Then, the control part is configured so as to receive an updating program transmitted from an external device and update the measurement control program by controlling the communication part based on the communication program.

However, since the measurement control program and the communication program are stored in a single internal memory, in the case where a power source is turned off while updating the measurement control program, not only will the measurement control program crash but also the communication program will crash. Then, there arises a problem that it becomes impossible to perform communication with an external device thereafter.

SUMMARY OF INVENTION

Technical Problem

The present invention has been made in consideration of the problems as described above, and an object thereof is to provide a fluid control device capable of inhibiting a communication program from crashing in the case where a power source is turned off while writing or rewriting of a measurement control program from an external device is being performed by a communication part.

Solution to Problem

That is, the fluid control device of the present invention includes: a measurement control part for measuring or controlling fluid; a communication part for performing communication with an external device; a first recording part for storing a communication program for controlling the communication part; a second recording part for storing a measurement control program for controlling the measurement control part; and a central processing unit.

In this configuration, the communication program stored in the first recording part is configured to be unrewritable by the central processing unit and the measurement control program stored in the second recording part is configured to be rewritable by the central processing unit. It is noted here that the measurement control part is considered to include at least one of a control element such as a flow control valve performing a fluid control in practice or a measuring element such as a flow sensor measuring a flow rate of the fluid for performing the fluid control.

With this configuration, since the fluid control device includes the first recording part for storing the communication program and the second recording part for storing the measurement control program and the communication program stored in the first recording part is configured to be unrewritable by the central processing unit and the measurement control program stored in the second recording part is configured to be rewritable by the central processing unit, it is possible to inhibit the communication program stored in the first recording part from crashing even in the case where a power source is turned off while writing or rewriting of the measurement control program from an external device is being performed by the communication part.

In this configuration, it is preferable that, the central processing unit has a chip select output terminal for outputting a chip select signal for selecting the first recording part or the second recording part and that the fluid control device includes: a chip select line for connecting the chip select output terminal with a chip select input terminal of the first recording part and a chip select input terminal of the second recording part; and a switch part for switching a recording part for inputting the chip select signal between the first recording part and the second recording part by switching the chip select line.

With this configuration, since it is possible to output the chip select signal to one of the first and second recording parts using the chip select output terminal, the other chip select output terminals in the central processing unit can be effectively used for the other components.

In the above configuration, it is preferable that, the central processing unit is intended to control the switch part, and that the fluid control device includes: a switching line which is connected to a general-purpose input and output terminal of the central processing unit and outputs a switching signal for switching the switch part, to the switch part.

With this configuration, the switch part can be controlled by the central processing unit without using the chip select output terminal of the central processing unit.

Advantageous Effects of Invention

According to the present invention configured as described above, since the measurement control program and the communication program are separately stored in the recording parts, even in the case where a power source is turned off while writing or rewriting for such as an update of a measurement control program is being performed by communication, it is possible to inhibit the communication program from crashing.

DESCRIPTION OF EMBODIMENTS

The following describes one embodiment of a fluid control device according to the present invention with reference to the accompanying drawings.

Figure 1:
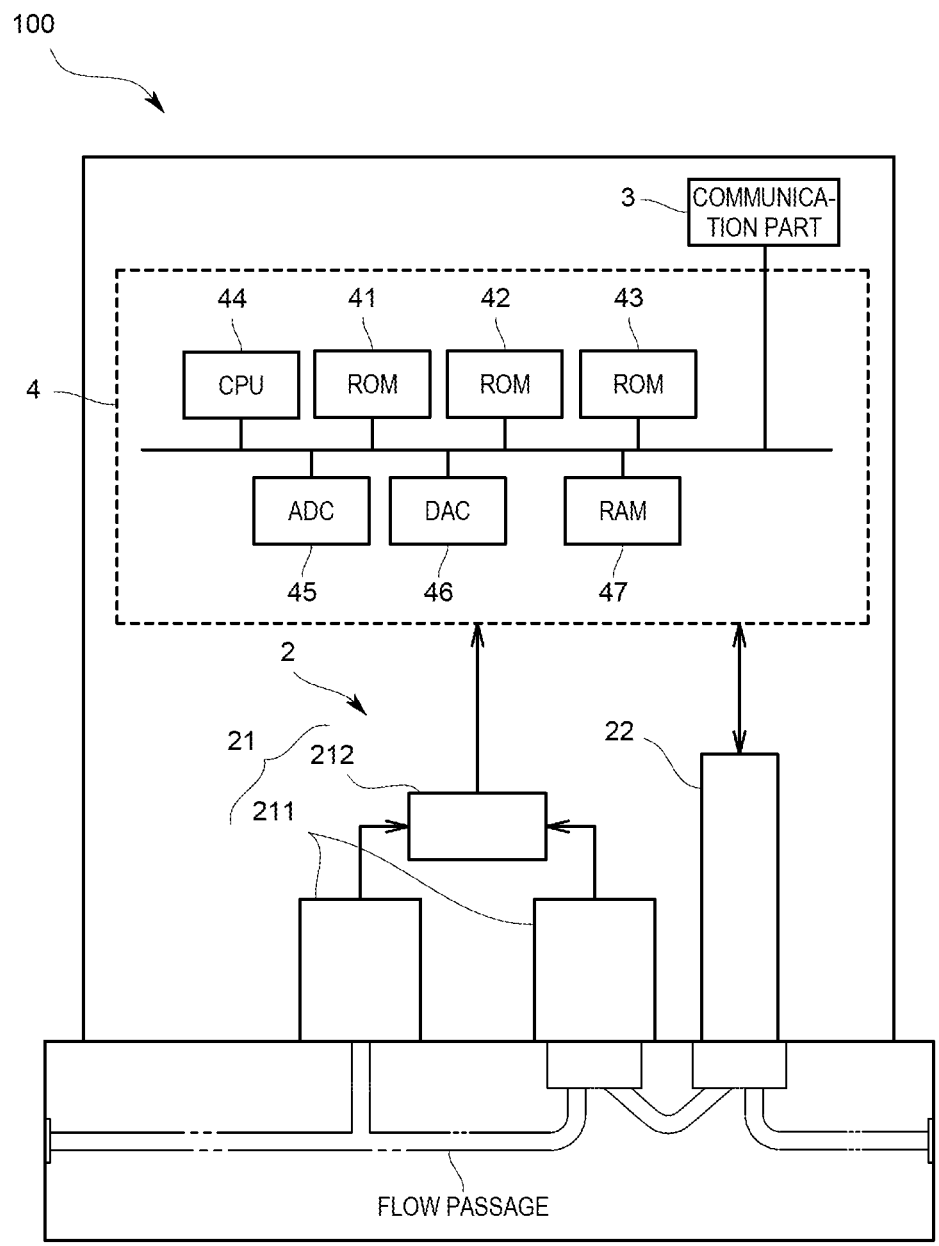
FIG. 1 is a schematic diagram showing a configuration of a fluid control device according to the present embodiment.

A fluid control device 100 of the present embodiment is a mass flow controller for controlling a flow rate of fluid such as gas or liquid for use in, for example, a semiconductor manufacturing apparatus. As shown in FIG. 1, the fluid control device 100 includes: a measurement control part 2 for measuring or controlling the fluid; a communication part 3 performing communication with an external device (not shown); and a control part 4 for controlling the measurement control part 2 and the communication part 3.

The measurement control part 2 includes: a flow sensor 21 of, for example, a differential pressure type for measuring a flow rate of fluid flowing through a flow passage; and a flow control valve 22 for adjusting a flow rate of the fluid flowing through the flow passage.

The flow sensor 21 includes: a sensing part 211 (which includes an upstream side pressure sensor and a downstream side pressure sensor) for detecting the instantaneous flow rate of the fluid as an electric signal; and an internal electrical circuit 212 for, e.g., amplifying the electric signal from the sensing part 211 and outputting a flow rate measurement signal as an analog signal corresponding to the flow rate. The flow control valve 22 is configured so that, for example, an opening degree of the valve can be varied by an actuator including, for example, a piezoelectric element. Thus, the actuator is driven by receiving an opening degree control signal as an electric signal from an external portion to thereby adjust the opening degree of the valve corresponding to a value of the opening degree control signal and control the flow rate of the fluid.

The communication part 3 is intended to perform communication with an external device such as, for example, a host controller (master unit), and it is intended to perform communication with an external device using a predetermined communication protocol. The communication part 3 of the present embodiment is intended to perform communication with an external device by EtherCAT. This communication part 3 may be configured using a dedicated IC for communication or may be also configured by incorporating the dedicated IC into a CPU 44 which constitutes the control part 4 to be described later. Here, assuming that the dedicated IC for communication configuring the communication part 3 is incorporated into the central processing unit 44 configuring the control part 4, it becomes possible to save a space and also becomes possible to reduce cost.

Figure 2:
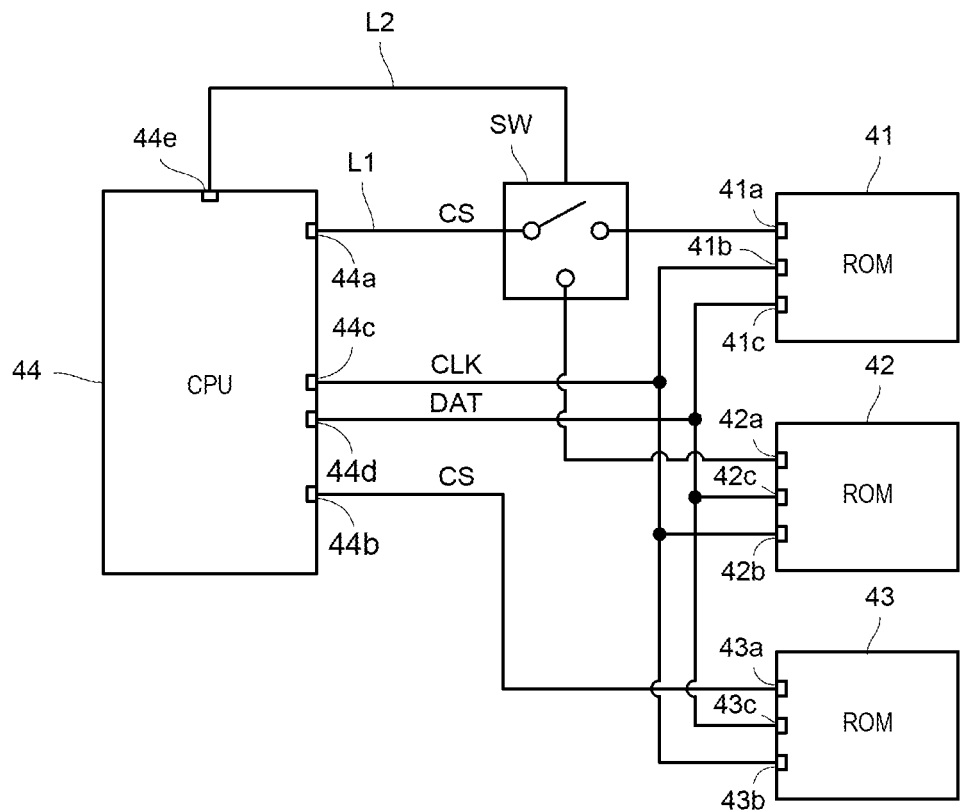
FIG. 2 is a schematic diagram showing a configuration of a control part in the same embodiment.

The control part 4 has a communication protection function and, as shown in FIGS. 1 and 2, it includes: a first recording part 41 for storing, for example, a communication program for controlling the communication part 3; a second recording part 42 for storing, for example, a measurement control program for controlling the measurement control part 2; and a central processing unit 44 for controlling the communication part 3 based on the communication program and for controlling the measurement control part 2 based on the measurement control program.

The first recording part 41 includes memory and, in the present embodiment, it is nonvolatile semiconductor memory such as, for example, a flash memory (flash ROM). In this first recording part 41, there are stored: a program (boot loader) for performing a boot process; a check program for checking by Cyclic Redundancy Check (CRC), for example, whether or not a program stored in the second recording part 42 to be described later has crashed; a communication program (firmware) for controlling the communication part 3 to perform communication with an external device by the EtherCAT; and an updating program for updating the program stored in the second recording part 42 to be described later. These programs are intended to be written in the first recording part 41 when producing or shipping a product, but these programs are not rewritten by the central processing unit 44 thereafter. It is noted that the first recording part 41 may be configured so as not to be structurally written by the central processing unit 44 by using a non-rewritable memory or may be configured so as not to be programmatically written by the central processing unit 44.

Similarly to the first recording part 41, the second recording part 42 includes memory and, in the present embodiment, it is nonvolatile semiconductor memory such as, for example, flash memory (flash ROM). In this second recording part 42, there are stored: a communication program (firmware) for controlling the communication part 3 to perform communication with an external device by the EtherCAT; and an updating program for updating a measurement control program stored in the second recording part 42; and the measurement control program (firmware) for controlling the measurement control part 2.

Specifically, in the second recording part 42, there is stored a control program for controlling the measurement control part 2 as a whole, and in the present embodiment, there is stored for example a control program for, e.g., Proportional, Integral and Derivative (PID) controlling the flow control valve 22 based on the flow rate measurement signal from the flow sensor 21. This control program is data indicative of a PID control algorithm and a control formula thereof for calculating a valve opening degree control signal. Each adjustment coefficient data of the control formula is stored in the third recording part 43 to be described later. It is noted that this measurement control program is intended to be written in the second recording part 42 when producing or shipping a product, and this program may be rewritten (updated) by the central processing unit 44 using the updating program thereafter in some cases.

In addition to the first recording part 41 and the second recording part 42, the control part 4 includes another recording part (third recording part 43). In this third recording part 43, there is stored data of each component part of the measurement control part 2 or data for use in control thereof, and in the present embodiment, there are stored: conversion characteristic data (coefficient data) indicative of conversion characteristics of the AD converter 45; conversion characteristic data (coefficient data) indicative of conversion characteristics of the DA converter 46; each adjustment coefficient data of the PID control to be used at the time of calculating the valve opening degree control signal; calibration curve data (sensor output-flow rate value data) indicative of a flow rate measurement value with respect to the sensor output (measurement data) of each of gas species; calibration curve data of an actual flow rate and measurement flow rate; correction data for correcting an instrumental error of the flow sensor 21 and the other component parts (such as, for example, a temperature sensor and a fluid resistance element (restrictor)) composing the measurement control part 2; various data obtained by an external sensor such as the flow sensor 21, for example, historical data of a gas supply pressure obtained by the upstream side pressure sensor in the case where the flow sensor 21 is a differential pressure sensor; traceability data (data indicative of version information of a correction tool) of products; and the like. This third recording part 43 includes memory and, in the present embodiment, it is nonvolatile semiconductor memory (such as, for example, EEPROM)). In the present embodiment, each of the first and second recording parts 41 and 42 includes a flash ROM and the third recording part 43 includes an EEPROM and therefore the third recording part 43 in which data is temporally stored during operation of the mass flow controller 100 uses memory having a higher writing speed than those of the first and second recording parts 41 and 42.

Particularly as shown in FIG. 2, the central processing unit 44 includes a CPU and has a single chip select output terminal 44a which outputs a chip select signal (CS) for selecting the first recording part 41 or the second recording part 42. In addition, the central processing unit 44 has: a chip select output terminal 44b which outputs a chip select signal (CS) for selecting the third recording part 43; a chip select output terminal (not shown) which outputs a chip select signal for selecting the AD converter 45; a chip select output terminal (not shown) which outputs a chip select signal for selecting the DA converter 46; a clock output terminal 44c for outputting a clock signal (CLK) to the first recording part 41 and second recording part 42, and the like; a data input/output terminal 44d for inputting and outputting various data (DAT) to and from such as the first recording part 41 and the second recording part 42, etc. In FIG. 2, reference numeral 41a denotes a chip select input terminal of the first recording part 41 to which the chip select signal is inputted from the central processing unit 44, reference numeral 41b denotes a clock input terminal of the first recording part 41 to which the clock signal is inputted from the central processing unit 44, and reference numeral 41c denotes a data input/output terminal of the first recording part 41 for inputting and outputting various data to and from the central processing unit 44. In addition, reference numeral 42a denotes a chip select input terminal of the second recording part 42 to which the chip select signal is inputted from the central processing unit 44, reference numeral 42b denotes a clock input terminal of the second recording part 42 to which the clock signal is inputted from the central processing unit 44, and reference numeral 42c denotes a data input/output terminal of the second recording part 42 for inputting and outputting various data to and from the central processing unit 44. Further, reference numeral 43a denotes a chip select input terminal of the third recording part 43 to which the chip select signal is inputted from the central processing unit 44, reference numeral 43b denotes a clock input terminal of the third recording part 43 to which the clock signal is inputted from the central processing unit 44, and reference numeral 43c denotes a data input/output terminal of the third recording part 43 for inputting and outputting various data to and from the central processing unit 44. Then, a signal line is connected between each of the terminals and each of the components. It is noted that the chip select output terminal (such as 44a and 44b) is not a general-purpose input/output terminal which is selected and operated based on a program read by the central processing unit 44 but a terminal which is operated by a hardware within the CPU and a terminal composing, for example, a serial peripheral interface (SPI) included in the central processing unit 44. The SPI mentioned above includes the chip select output terminals (such as 44a and 44b), clock output terminal 44c and data input/output terminal (such as 44d).

In particular, the chip select output terminal 44a is connected with a chip select line L1 for selectively connecting with the chip select input terminal 41a of the first recording part 41 and the chip select input terminal 42a of the second recording part 42, and a switch part SW is provided on the chip select line L1.

This switch part SW is provided for switching the chip select line L1 for selecting a recording part to which the chip select signal is inputted between the first recording part 41 and the second recording part 42.

Further, this switch part SW is connected with a switching line L2 which is connected to the general-purpose input/output terminal 44e of the central processing unit 44 and outputs a switching signal for switching the switch part SW. With this switching line L2, the switch part SW is controlled by the central processing unit 44. The general-purpose input/output terminal 44e is a terminal which is selected and operated based on the program read by the central processing unit 44.

Figure 3:
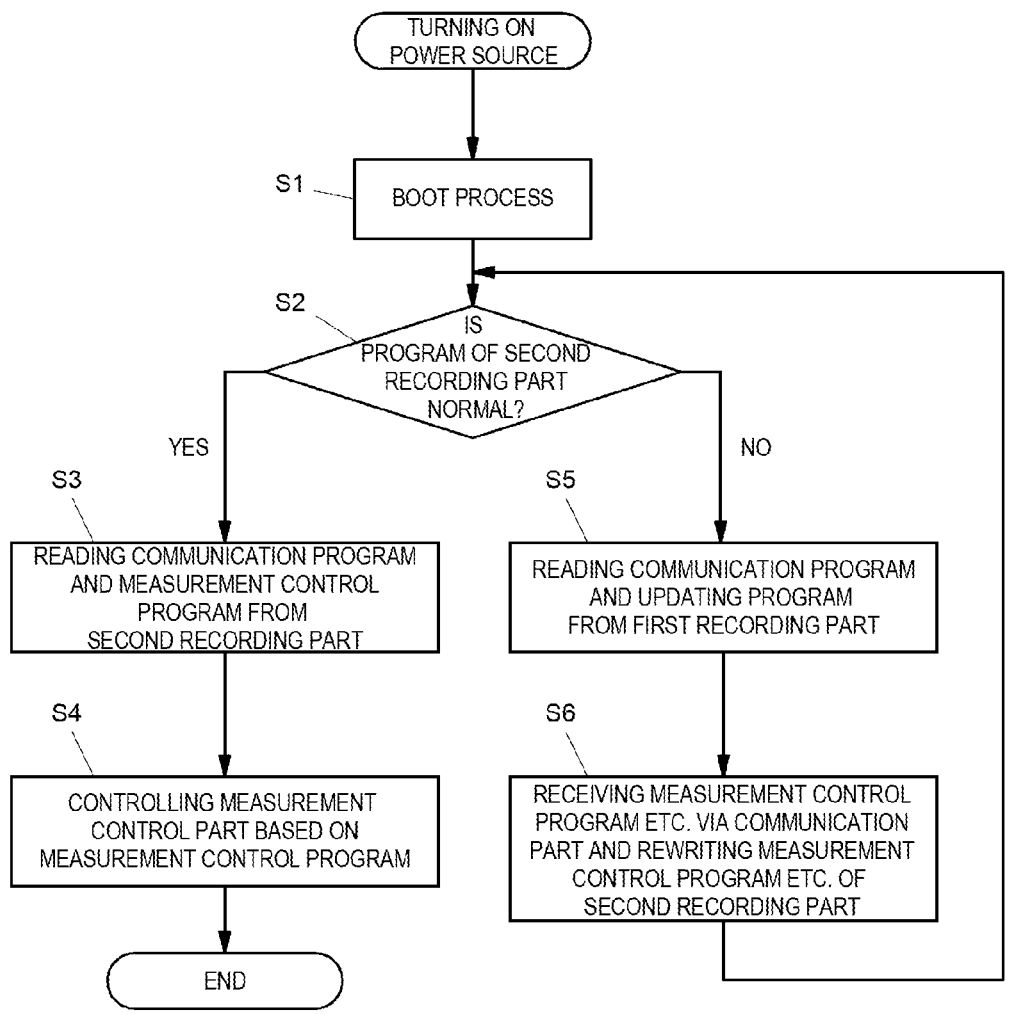
FIG. 3 is a flowchart showing an operation of the control part in the same embodiment.

Next, the following describes an operation of the mass flow controller 100 with reference to FIG. 3. Upon turning on a power source of the mass flow controller 100, the central processing unit 44 outputs the switching signal to the switch part SW and controls the switch part SW to connect between the chip select output terminal 44a of the central processing unit 44 and the chip select input terminal 41a of the first recording part 41 to thereby output the chip select signal to the first recording part 41. Then, the central processing unit 44 reads the boot loader stored in the first recording part 41 onto a main memory (RAM) 47 and performs a boot process using the program read on the main memory 47 (Step S1). Further, the central processing unit 44 reads the check program stored in the first recording part 41 onto the main memory (RAM) 47 and checks whether or not the program stored in the second recording part 42 is normal using the program read on the main memory 47 (Step S2). Here, the checking is performed by comparing between a CRC value when the program stored in the second recording part 42 is normal (for example, at a time shipment of products) and a CRC value at a time of checking and based on whether or not these CRC values are coincident. In the case where both of the CRC values are coincident, it is determined that the program stored in the second recording part 42 is normal, and in the case where both of the CRC values are different, it is determined that the program stored in the second recording part 42 is abnormal.

As a result of Step S2 mentioned above, in the case where the program stored in the second recording part 42 is normal, the central processing unit 44 outputs the switching signal to the switch part SW and controls the switch part SW to connect between the chip select output terminal 44a of the central processing unit 44 and the chip select input terminal 42a of the second recording part 42 and outputs the chip select signal to the second recording part 42. Then, the central processing unit 44 reads the communication program stored in the second recording part 42 onto the main memory (RAM) 47 (Step S3) and controls the communication part 3 using the program read onto the main memory 47 (Step S4). Further, the central processing unit 44 reads the measurement control program stored in the second recording part 42 onto the main memory (RAM) 47 (Step S3) and controls the measurement control part 2 using the program read onto the main memory 47 (Step S4).

Meanwhile, as a result of Step S2 mentioned above, in the case where there is an abnormality such as the program stored in the second recording part 42 having crashed, the central processing unit 44 outputs the switching signal to the switch part SW and controls the switch part SW to connect between the chip select output terminal 44a of the central processing unit 44 and the chip select input terminal 41a of the first recording part 41 and outputs the chip select signal to the first recording part 41. Then, the central processing unit 44 reads the communication program stored in the first recording part 41 onto the main memory (RAM) 47 (Step S5) and controls the communication part 3 using the program read onto the main memory 47 (Step S6). Further, the central processing unit 44 reads the updating program stored in the first recording part 41 onto the main memory (RAM) 47 (Step S5) and stores the updating measurement control program obtained via the communication part 3 in the second recording part 42 and rewrites the measurement control program using the program read onto the main memory 47 (Step S6). Thereafter, a normal operation of the mass flow controller is performed by Steps S3 and S4 described above. It is noted that the operation may be ended without performing the processes in Steps S3 and S4 after Step S6.

Further, in the present embodiment, the first recording part 41, the second recording part 42 and the central processing unit 44 are mounted on the same first substrate. Meanwhile, the third recording part 43 is mounted on a second substrate different from the first substrate. Thus, since the substrate for mounting the first recording part 41, second recording part 42, and central processing unit 44 is physically separated from the substrate for mounting the third recording part 43, even in the case where the central processing unit 44 and the first recording part 41 etc. are replaced due to such as a failure of the first substrate, for example, a failure of the central processing unit 44 and a failure of the first rerecording part 41, the central processing unit 44 and the first recording part 41 etc. can be replaced while retaining the data previously accumulated and stored in the third recording part 43. In addition, the AD converter and DA converter etc. are mounted on the second substrate.

According to the mass flow controller 100 of the present embodiment configured as described above, since the fluid control device includes the first recording part 41 for storing the communication program and the second recording part 42 for storing the measurement control program and the communication program stored in the first recording part 41 is configured to be unrewritable by the central processing unit 44 and the measurement control program stored in the second recording part 42 is configured to be rewritable by the central processing unit 44, it is possible to inhibit the communication program stored in the first recording part 41 from crashing even in the case where a power source is turned off while rewriting the measurement control program via the communication part 3. In such a case, the communication for writing the measurement control program in the second recording part 42 can be made possible using the communication program stored in the first recording part 41 and the measurement control program can be rewritten.

Further, since it is configured that the chip select line L1 for connecting the chip select output terminal 44a with the chip select input terminal 41a of the first recording part 41 and the chip select input terminal 42a of the second recording part 42 is switched by the switch part SW, the other chip select output terminals in the central processing unit 44 can be effectively used for the other components.

Moreover, since the switch part SW is controlled by the switching line L2 which is connected to the general-purpose input/output terminal 44e of the central processing unit 44, the switch part SW can be controlled by the central processing unit 44 without using the chip select output terminal of the central processing unit 44.

It is noted that the present invention should not be limited to the embodiment mentioned above.

For example, in the above embodiment, although the chip select output terminal is used in common between the first recording part and the second recording part, it is also possible to use respectively different chip select output terminals.

Further, although the fluid control device of the present embodiment is a mass flow controller and the measurement control part has a flow sensor and flow control valve, the measurement control part of the fluid control device may include only a measurement element such as a flow sensor or may include only a control element such as a flow control valve. Further, although the flow sensor of the present embodiment is a differential pressure flow sensor, it may be also a thermal flow sensor. Further, the fluid control device may be also a pressure controller having a pressure sensor for controlling a pressure of the fluid.

Further, in the above embodiment, although the first recording part 41 stores the check program separately from the boot loader, it is also possible that the boot loader may have a checking function.

Furthermore, the measurement control part 2 and control part 4 of the above embodiment may be accommodated in a single casing and also may be configured by connecting the measurement control part 2 and control part 4 via a cable.

In addition, the programs respectively recorded in the second recording part 42 and the third recording part 43 of the embodiment are not limited to those in the embodiment, and it may be configured that the data stored in the second recording part 42 may be partly recorded in the third recording part 43.

In addition, the present invention may be also adapted to a measurement device including: a measurement part for measuring such as a physical quantity and chemical quantity of a measurement target object; a communication part for performing communication with an external device; a first recording part for storing a communication program for controlling the communication part; a second recording part for storing a measurement control program for controlling the measurement part; and a central processing unit, and the communication program stored in the first recording part being configured to be unrewritable by the central processing unit and the measurement control program stored in the second recording part being configured to be rewritable by the central processing unit. In addition, the measurement part may be also adapted to one performing, for example, an electrochemical measurement such as a pH meter, or may be adapted to one performing an optical measurement using light such as ultraviolet rays, visible light, infrared rays, and near-infrared rays, or may be designed to perform the other analyses.

In addition, the embodiment of the present invention should not be limited to the above embodiment and various changes and modifications can be made unless departing from the intended spirit thereof.

REFERENCE CHARACTER LIST

100 . . . Mass flow controller (fluid control device)
2 . . . Measurement control part
21 . . . Flow sensor
22 . . . Flow control valve
3 . . . Communication part
4 . . . Control part
41 . . . First recording part
42 . . . Second recording part
44 . . . Central processing unit
44a . . . Chip select output terminal
44e . . . General-purpose input and output terminal
L1 . . . Chip select line
SW . . . Switch part
L2 . . . Switching line

The invention claimed is:

1. A fluid control device comprising:
a measurement control part for measuring or controlling fluid;
a communication part for performing communication with an external device;
a first recording part for storing a communication program for controlling the communication part;
a second recording part for storing a measurement control program for controlling the measurement control part;
a third recording part for storing data of each component part of the measurement control part or data for use in control thereof; and
a central processing unit, wherein
the communication program stored in the first recording part is configured to be unrewritable by the central processing unit and the measurement control program stored in the second recording part is configured to be rewritable by the central processing unit, wherein
the central processing unit has a chip select output terminal for outputting a chip select signal for selecting alternatively the first recording part or the second recording part,
the fluid control device including:
a chip select line for connecting the chip select output terminal with a chip select input terminal of the first recording part and a chip select input terminal of the second recording part; and
a switch part for alternatively switching a recording part for inputting the chip select signal between the first recording part and the second recording part by switching the chip select line, wherein
the first recording part, the second recording part, and the central processing unit are mounted on the same first mounting apparatus; and
the third recording part is mounted on a second mounting apparatus that is separate and different from the first substrate;
where the third recording part of the second mounting apparatus is configured to retain data during replacement of the first or second recording parts of the first mounting apparatus due to failure of the first or second recording parts.

2. The fluid control device according to claim 1, wherein the central processing unit is configured to control the switch part,
the fluid control device including:
a switching line which is connected to a general-purpose input and output terminal of the central processing unit and outputs, to the switch part, a switching signal for switching the switch part.

* * * * *